(12) United States Patent
Anderson et al.

(10) Patent No.: US 7,485,330 B2
(45) Date of Patent: Feb. 3, 2009

(54) FOODSTUFF CONTAINING A MOIST MEATY FILLING

(75) Inventors: David A. Anderson, Terminal Island, CA (US); Richard L. Harpe, Terminal Island, CA (US)

(73) Assignee: Redbarn Pet Products, Inc., Long Beach, CA (US)

( * ) Notice: Subject to any disclaimer, the term of this patent is extended or adjusted under 35 U.S.C. 154(b) by 1063 days.

(21) Appl. No.: 10/772,866

(22) Filed: Feb. 6, 2004

(65) Prior Publication Data

US 2004/0219260 A1 Nov. 4, 2004

Related U.S. Application Data

(63) Continuation-in-part of application No. 29/171,603, filed on Nov. 26, 2002, now Pat. No. Des. 487,327.

(51) Int. Cl.
*A23L 1/10* (2006.01)
*A23K 1/00* (2006.01)
*A23K 1/18* (2006.01)

(52) U.S. Cl. .......................... 426/92; 426/94; 426/656; 426/658; 426/805

(58) Field of Classification Search .................. 426/92, 426/94, 656, 658, 805
See application file for complete search history.

(56) References Cited

U.S. PATENT DOCUMENTS

| | | | | |
|---|---|---|---|---|
| 3,808,340 A | * | 4/1974 | Palmer et al. | 426/92 |
| 4,032,665 A | * | 6/1977 | Miller et al. | 426/104 |
| 4,039,687 A | * | 8/1977 | Weyn | 426/62 |
| 4,366,175 A | * | 12/1982 | Brown et al. | 426/92 |
| 4,371,556 A | * | 2/1983 | Pitchon et al. | 426/311 |
| 4,401,681 A | * | 8/1983 | Dahle | 426/94 |
| 4,822,626 A | * | 4/1989 | Spanier et al. | 426/94 |
| 4,904,494 A | * | 2/1990 | Spanier | 426/646 |
| 5,532,010 A | * | 7/1996 | Spanier et al. | 426/94 |
| 5,731,029 A | * | 3/1998 | Karwowski et al. | 426/646 |

FOREIGN PATENT DOCUMENTS

JP 59045863 A * 3/1984

* cited by examiner

*Primary Examiner*—C. Sayala
(74) *Attorney, Agent, or Firm*—Paul M Denk

(57) ABSTRACT

A biscuit treat for dogs has improved palatability by incorporating a highly palatable shelf stable meaty filling into a cavity formed upon the top surface of the biscuit. The meaty filling includes agar as a gelling agent in combination with sufficient soluble solids to yield a high Brix number and reduced water activity. Precise quantities of agar and of a soluble solids concentration exceeding 65% eliminate capillary transfer of moisture from the highly aqueous meaty filling to the low moisture dry biscuit. The resulting highly palatable two phase biscuit has a long shelf life suitable for commercialization in the pet treat market.

10 Claims, 1 Drawing Sheet

FOODSTUFF CONTAINING A MOIST MEATY FILLING

CROSS-REFERENCE TO RELATED APPLICATIONS

This application is a continuation-in-part of the design patent application filed on Nov. 26, 2002, now U.S. Pat. No. D,487,327, under Ser. No. 29/171,603, and claims priority thereto.

BACKGROUND OF THE INVENTION

1. Field of the Invention

The present invention relates to a foodstuff containing a moist meaty filling for use in connection with shelf stable biscuits. The foodstuff containing a moist meaty filling has particular utility in connection with a gel in a recessed cavity upon a biscuit.

2. Description of the Prior Art

Foodstuffs containing a moist meaty filling are desired by pets across the country, especially dogs. Dogs consume biscuits by the millions each year. The biscuit provides a crunchy food often as a snack or treat. When chewed, the biscuit crumbles and the pieces assist in cleaning a dog's teeth. Dogs also like wet food, commonly served from a can. Wet food usually has a meaty taste and consistency to satisfy a dog's instinctual need for meat. Combining meaty wet food with a dry biscuit in an un-refrigerated form has challenged the pet food industry.

The use of shelf stable meaty products is known in the prior art that illustrates alternative methods for producing a combination product of dry biscuit and meaty filling, dry and wet phases respectively. Many alternate methods combine the soft and hard foodstuffs into a single unit. Numerous methods of co-extrusion exist as well as encapsulating and coating techniques for combining the soft and hard foodstuffs.

The prior art demonstrated both pet food and treat application as well as human food applications. For pets, a wide range of two phase products has been demonstrated where both phases remain at their natural moisture levels. For example, U.S. Pat. No. 3,922,353 to Bernotavicz discloses a shelf stable high moisture product. Made by a typical co-extrusion technique, the product includes a filling containing up to 50% moisture and a water activity exceeding 0.9. The product has a cereal based outer shell baked and then partly dehydrated after extrusion. For preservation, the product maintains a low pH of approximately 3.9 to approximately 5.5 with up to 8% acid the in the cereal phase.

U.S. Pat. No. 4,276,311 to Burrows et al. shows another acid stabilized two component pet food. The '311 patent has solid protein pieces mixed in an aqueous gel with later bacterial growth utilized to lower the pH below 4.5 for long term stability.

Similarly, U.S. Pat. No. 5,695,797 to Geromini et al. teaches a co-extruded pet food with an outer casing and an inner filling. The outer casing has a moisture content between 20% and 40% while an oil based substrate composes the inner filling, representing 30% to 40% of the total volume. The high moisture level of the outer shell results in a total loss of crunchiness in a biscuit formed by this technique. A fat based filling on the surface of a biscuit causes wicking of the packaging and possible staining of rugs in a pet's home.

Similarly, U.S. Pat. No. 3,916,029 to Hildebolt discloses a center filled pet food with an outer pastry shell and a higher moisture inner filling. This co-extruded technique uses puts all of the desired salt from the formula and a majority of the soluble sugar fraction from the formula into the inner filling to allow a higher moisture phase on the inside of the product. After baking, the outside cereal shell has about 13.5% moisture and the inner filling has 20% to 25% moisture. However, the water activities of the two phases remain about the same and range between 0.82 and 0.83. As in Gerominin's '797 patent, the elevated moisture level in the outer shell results in the loss of crunch in the finished product.

Other techniques result in a two phase pet food system but rely on dehydration of both fractions for long term stability. One techniques appears in U.S. Pat. No. 4,190,679 to Coffee et al. that discloses a dual textured pet food product. This product relies on formulation and processing techniques that yield two different types of particles packaged together within the same foodstuff.

Similarly, U.S. Pat. No. 4,006,266 to Bone et al. offers a pet food with separate hard component pieces and soft component pieces mixed in a final blended product. This patent specified moisture levels in the range of 8% to 12% for the hard component and 10% to 14% for the soft component. However, the patent specified equal water activites for the hard and soft components that jointly ranged from 0.60 to 0.75.

Then U.S. Pat. No. 4,273,788 to Bone et al. again provides a mixture of hard and soft components of a pet food using slender strands to formulate a softer fraction. Again, both components had equal water activities that jointly ranged from 0.60 to 0.75. The Bone and Coffee patents disclose separate individual particles within the same ration and could produce a biscuit containing a meaty filling.

Another approach for a two phase system formulates a single dry phase and aligns the dry phase with an oil based secondary fraction. U.S. Pat. No. 6,117,477 to Paluch discloses a multiple component food product formed by co-extrusion of a dry outer phase surrounding an oil based inner phase. Paluch in U.S. Pat. No. 6,254,910 builds upon the '477 patent with a method to incorporate a process unstable ingredient into the inner phase. Both of Paluch's patents call for a moisture level of less than 15%.

Similarly, U.S. Pat. No. 5,695,797 to Geromini teaches a co-extruded pet food with a high moisture outer shell preserved by acid and a vegetable oil or fat based inner filling. As discussed above, in producing a biscuit with a meaty topping, these techniques would cause wicking in packages and stains upon rugs in pet homes because of the oily fat layer exposed upon the surface of the biscuit.

Then similarly in U.S. Pat. No. 4,508,741 to Corbett et al. describes a method for combining separate phases in a pet food by coating a farinaceous based core with two additional components to yield a final product with a glistening appearance. All phases dry during processing and yield equal moisture and water activity.

Similarly, U.S. Pat. No. 5,673,653 to Sherrill also teaches a dual phase product composed of rawhide wrapped around a sliced meat fraction. This dehydrated product has phases of similar moisture levels.

Similarly, U.S. Pat. No. 4,364,925 to Fisher has a unitized animal feed system with mixed structural fibers within a continuous matrix. As in Sherrill, the dehydrated phases have similar moisture content.

Similarly, U.S. Pat. No. 5,635,237 to Greenberg et al. shows a co-extrusion rawhide having both inner and outer cores of a rawhide fraction. Inclusion of rawhide further softens the inner core but the moisture levels of both phases remain nearly equal. These dehydration methods worsen the palatability in comparison to the present invention.

Then similarly, U.S. Pat. No. 6,238,715 to Baikie claims a gel filling deposited into the center of a sterilized animal bone. This technique predates the patents in the assignor's portfolio. While the two phases—filling and bone—have different moisture levels, moisture does not transfer between them due to the pure ash nature of sterilized animal bone.

Similarly, U.S. Pat. No. 6,277,420 demonstrates two phase systems for pet treats with one phase of intermediate moisture filling and the second phase of dehydrated or chopped and reformed rawhide. This patent had limited moisture migration but, the dehydrated fraction—the rawhide—did not contain any carbohydrate or soluble protein fractions. Therefore, the second phase has less tendency to collect moisture from a filling than a baked biscuit with soluble grain fraction.

Turning to human foods, two separate phases with different moisture levels form a single food item. Most of these dual phase foods require refrigeration or freezing during distribution and sale. In U.S. Pat. No. 4,574,690 to Chiao a method co-extrudes wrapped food products with separate phases. This method relies upon freezing the final product to maintain stability and to reduce moisture transfer between the phases.

Similarly, U.S. Pat. No. 5,525,366 to Zuckerman et al. shows a two part food product having an outer grain shell and an inner non-grain interior. The product is formed with primarily whole grains and while moisture levels vary between the two phases, commercial distribution requires a frozen product. Freezing of the product reduces the transfer of moisture between the phases.

Then in U.S. Pat. No. 4,847,098 to Langler, two different food textures have their water activities equalized to reduce moisture migration between the two phases. This patent teaches a dual textured food combining an outer shell fraction and a second fluid core portion. Though generally a gel, the core has a center filling of water in an oil emulsion. The water activities of the shell and core remain equal and range between 0.50 and 0.80.

Then in U.S. Pat. No. 5,455,059 to McFeaters fat free topping and filling for bakery items yield foods with two distinct textures and appearances for the same product. Patent '059 has fat free topping formula with 60% to 70% sugar and 7% to 12% converted starch to bind the product. A humectant like glycerol achieves a water activity below 0.70 in the topping. Though successful with bakery products, this topping has a shelf life of at most three months.

Lastly in U.S. Pat. No. 4,401,681 to Dahle a two phased food has reduced inter-phase moisture transfer. While reducing moisture transfer between two components, this patent has difficulties in adaptation to a filled biscuit. The claims indicate partial dehydration of the surface of the high moisture phase prior to contact with the lower moisture shell. A barrier layer forms upon providing dextrin to the high moisture component along with a hydrophilic polysaccharide gelling agent like pectin. Creating this barrier film at production speeds for economical manufacturing has high difficulty. This patent also teaches an outer dough phase ranging from 20% to 40% by weight and an inner jelly phases ranging from 25% to 60% by weight. The somewhat high moisture in the dough phase results in a fragile biscuit and loss of the crunch expected by the consumer for a pet biscuit. The patent omits discussion of water activity and apparently, the two phases likely have the same water activity. Yet, the filling can have a higher percentage of water because of the filling's high sugar content. Also, the shelf life for this dough and jelly product extends for only several months and not the year or more typical in pet foods.

While the above-described devices fulfill their respective, particular objectives and requirements, the aforementioned patents do not describe an foodstuff containing a moist meaty filling that allows a recessed cavity containing a shelf stable moist meaty filling.

Therefore, a need exists for a new and improved foodstuff containing a moist meaty filling that can be used for a recessed cavity containing a shelf stable moist meaty filling. This invention teaches a unique ability to maintain two separate phases of food in direct contact with each other and the phases contain significantly different moisture levels and A sub w levels. A sub w (water activity) measures the unbound, free water in a foodstuff available to support microbiological growth. Water activity arises from the partial vapor pressure of water in the foodstuff divided by the saturation vapor pressure of pure water at the same temperature. The product of this invention remains stable for up to eighteen months without a noticeable transfer of moisture between the dry biscuit and meaty filling. In this regard, the present invention substantially fulfills this need. In this respect, the foodstuff containing a moist meaty filling according to the present invention substantially departs from the conventional concepts and designs of the prior art, and in doing so provides an apparatus primarily developed for the purpose of a recessed cavity containing a shelf stable moist meaty filling.

SUMMARY OF THE INVENTION

In view of the foregoing disadvantages inherent in the known types of shelf stable meaty products now present in the prior art, the present invention provides an improved foodstuff containing a moist meaty filling, and overcomes the above-mentioned disadvantages and drawbacks of the prior art. As such, the general purpose of the present invention, which will be described subsequently in greater detail, is to provide a new and improved foodstuff containing a moist meaty filling and method which has all the advantages of the prior art mentioned heretofore and many novel features that result in a foodstuff containing a moist meaty filling which is not anticipated, rendered obvious, suggested, or even implied by the prior art, either alone or in any combination thereof.

To attain this, the present invention essentially comprises a biscuit with a filling. The biscuit has a formulation desired by dogs, the shape of a typical dog bone, and a raised edge upon the entire upper circumference of the biscuit. An engraved forming die forms the biscuit and the raised edge. The filling remains shelf stable and has a gelling agent—agar—and a soluble solids level in excess of 65 Brix. The Brix scale measures sugar content with a hydrometer. Further, the filling has a water activity between 0.65 and 0.85. The formulation and process of the present invention results in two separate phases—filling and outer biscuit—having different water activities over lengthy time periods. The filling retains its moisture away from the biscuit. Thus, two separate phases —in contact with each other—maintain different moisture levels and different water activities. There has thus been outlined, rather broadly, the more important features of the invention in order that the detailed description thereof that follows may be better understood and in order that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and the scope of the present invention.

It is therefore an object of the present invention to provide a new and improved foodstuff containing a moist meaty filling that has all of the advantages of the prior art shelf stable meaty products and none of the disadvantages.

It is another object of the present invention to provide a new and improved foodstuff containing a moist meaty filling that may be easily and efficiently manufactured and marketed.

An even further object of the present invention is to provide a new and improved foodstuff containing a moist meaty filling that has a low cost of manufacture with regard to both materials and labor, and which accordingly is then susceptible of low prices of sale, thereby making such foodstuff containing a moist meaty filling economically available to pet owners everywhere.

Still another object of the present invention is to provide a new foodstuff containing a moist meaty filling that provides in the apparatuses and methods of the prior art some of the advantages thereof, while simultaneously overcoming some of the disadvantages normally associated therewith.

Even still another object of the present invention is to provide an foodstuff containing a moist meaty filling for a recessed cavity containing a shelf stable moist meaty filling. This allows a more palatable dog biscuit than those currently on the market.

Still yet another object of the present invention is to provide a foodstuff containing a moist meaty filling for a recessed cavity containing a shelf stable moist meaty filling. This makes it possible to improve palatability by combining two separate phases with a dog biscuit.

Still yet another object of the present invention is to provide a foodstuff containing a moist meaty filling for a recessed cavity containing a shelf stable moist meaty filling. This makes it possible for a raised edge upon the biscuit.

Lastly, it is an object of the present invention to provide a new and improved two phase food for animals that has a long shelf life without refrigeration or freezing.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
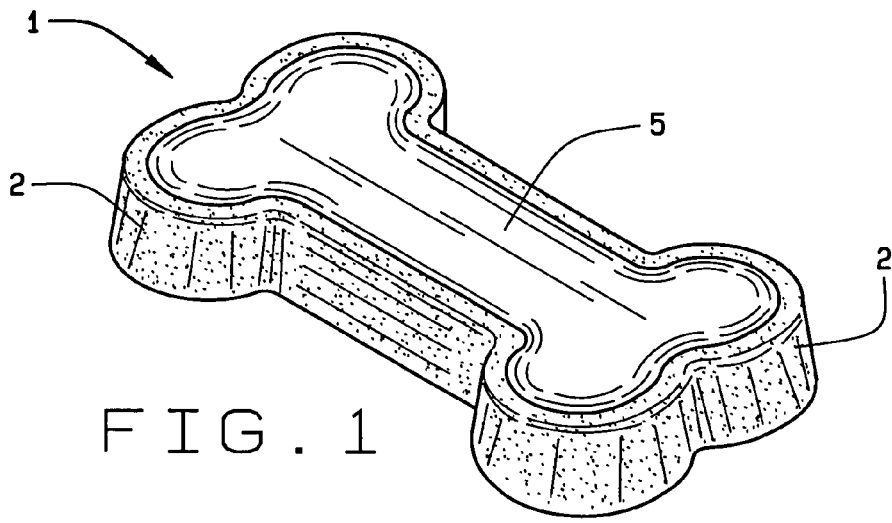
FIG. 1 is an isometric view of the preferred embodiment of the foodstuff containing a moist meaty filling constructed in accordance with the principles of the present invention.

Referring now to the drawings, and particularly to FIGS. 1-6, a preferred embodiment of the foodstuff containing a moist meaty filling of the present invention is shown and generally designated by the reference numeral 1.

In FIG. 1, a new and improved foodstuff containing a moist meaty filling 1 of the present invention for a recessed cavity containing a shelf stable moist meaty filling 5 is illustrated and will be described. More particularly, the foodstuff containing a moist meaty filling 1 has a biscuit 2 with a raised edge 4 to contain the filling. The biscuit 2 generally has a top surface 3 and the shape of a common dog bone though other shapes exist. The raised edge 4 rises from the perimeter of the biscuit 2 as later described. When in place, the filling 5 solidifies to a gel and remains slightly below the raised edge 4.

Figure 2:
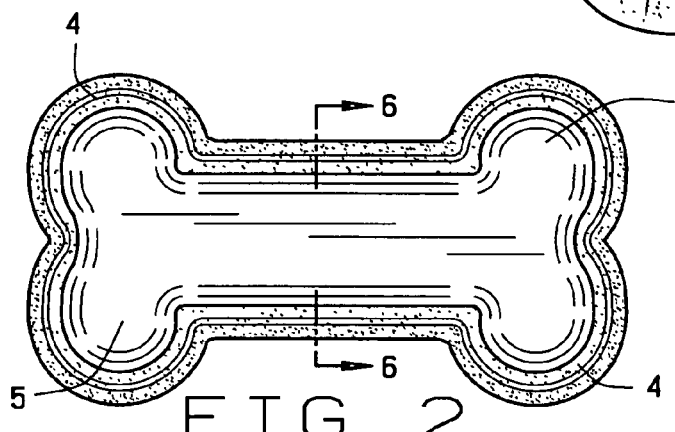
FIG. 2 is a plan view of the top of the foodstuff containing a moist meaty filling of the present invention.

Turning to FIG. 2, the dog bone shaped biscuit 2 has the filling 5 contained within the raised edge 4 upon the top surface 3. The raised edge 4 follows the perimeter of the biscuit 2 and is slightly inside the footprint of the biscuit 2.

Figure 3:
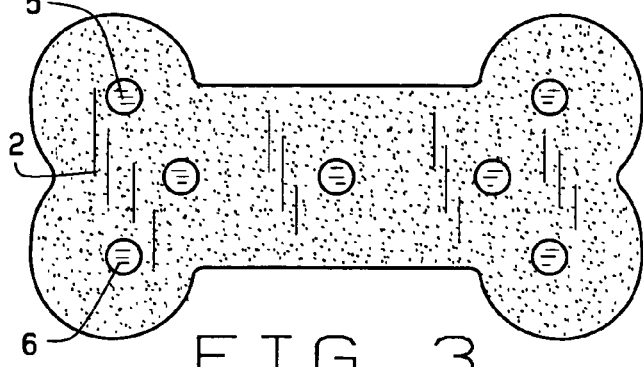
FIG. 3 is a plan view of the bottom of the foodstuff containing a moist meaty filling of the present invention.

Opposite of FIG. 3, the biscuit 2 has two or more holes 6 to admit filling. The holes pass through the thickness of the biscuit 2 and terminate inside the cavity formed by within the raised edge 4. The holes are made by punching in the preferred embodiment. Alternatively, the holes can be made by casting, drilling, or other common methods. When the filling 5 solidifies as a gel, the filling 5 within the holes 6 mechanically binds the gel to the biscuit 2.

Figure 5:
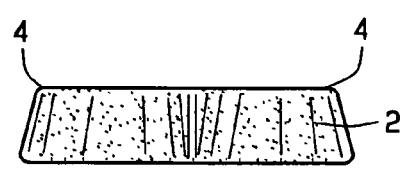
FIG. 5 is an elevation view of the foodstuff containing a moist meaty filling of the present invention upon the lateral axis.
Figure 4:
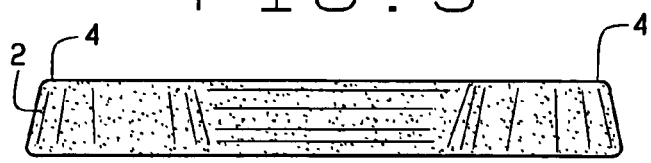
FIG. 4 is a elevation view of the foodstuff containing a moist meaty filling of the present invention upon the longitudinal axis.

Then in FIGS. 4 & 5, the biscuit 2 has a generally tapered perimeter. The footprint of the biscuit 2 is larger than perimeter of the raised edge 4. The taper assists in removing the biscuit 2 from a forming die described below.

Figure 6:
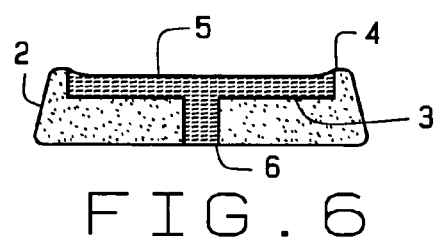
FIG. 6 is a section view through the biscuit and filling of the foodstuff containing a moist meaty filling of the present invention.

Inwards from FIG. 5, FIG. 6 shows a section through the filling 5 and the biscuit 2 at a hole. The raised edge 4 at the perimeter of the biscuit 2 along with the top surface 3 contains the filling 5 within the biscuit 2.

Then in use, the biscuit of the present invention has a typical formulation and process utilized in a wide range of dog treats currently on the market. The formulations include ground wheat or wheat flour, ground corn, meat meal, whey, brewers yeast, soybean meal, coloring, flavoring, and an assortment of vitamin and mineral premixes. Typically, the ingredients mix with approximately 25% water to become a dough. The dough moves along a conveyor to a rotary molding machine, such as that produced by APV Baker.

The die in the rotary molder produces a biscuit with a recessed cavity on the top surface of the biscuit. The die accomplishes this by forming a raised edge around the circumference of the biscuit. The raised edge provides the ability to deposit a liquid filling in the form of a gravy onto the top surface of the biscuit. The gravy formula, as it cools to room temperature, solidifies into a solid gel and attaches to the top surface of the biscuit. The raised edge dams the liquid filling within the recessed cavity until it cools and permanently joins the top surface of the biscuit.

Manufacturing forms the biscuit into a wide range of shapes and sizes. The most common shape, a bone shape akin to a femur, appears in FIG. 1. Alternate shapes for biscuits include square or rectangular that are compatible with the invention. The biscuit and alternates have a wide variety of brands and sizes, commonly designated as small, medium, and large.

Conceivably, biscuits with a raised edge could have any size, but processing constraints, such as biscuit release from a die roller and control of liquid deposits, suggest that this invention applies more to medium and large biscuits.

The height and width of the raised edge can vary but practicality suggests a designated narrow range of variation. Experiments tell of a one eighth (⅛") inch minimum height of the raised edge above the top surface of the biscuit. A raised edge with a one eighth (⅛") inch minimum width works well. For smooth release of biscuits from the die, the vertical sides of the raised edge have an angle where the base of the raised edge, proximate to the top surface, is wider than the top of the raised edge.

In contrast, the maximum height of the raised edge from the cavity in the biscuit has less importance than the width. The height has constraints as the raised edge becomes greater, either the biscuit becomes larger or the cavity becomes thinner. A thinner cavity weakens the structure of the biscuit and leads to more broken biscuits. Practically, the maximum height of the raised edge is forty five (45%) percent of the total height of the biscuit including the raised edge.

Perpendicular to the maximum height, the maximum width of the raised edge depends upon the desired volume of filling and desired visual effect upon the biscuit. Experiments tell that for the desired effect upon dogs, the maximum width of the raised edge at the top of the biscuit is no more than thirty three (33%) percent of the total width of the biscuit.

Meanwhile, the dough exits the rotary molder in a biscuit shape and conveyors send it to a baking oven for approximately seventeen (17) minutes at 375 deg F. where it becomes biscuits. The biscuits then enter a conveyor dryer for dehydration to a moisture level below 10%. Lastly, the biscuits then enter a cooling conveyor to reduce their temperature to below approximately 100 deg F. in preparation for adding the meaty filling.

The filling of the present invention has a formulation for deposit into the cavity of the biscuits and for setting as a gel. The gel becomes irreversible within the temperature parameters encountered during the distribution and sale of the biscuits. Experiments revealed that agar is the preferable gelling agent. The liquid slurry has a composition of water or meat fraction having natural moisture so that the filling attains a final moisture content of between 15% and 30% moisture. The present invention also requires the filling to have a minimum of 65 Brix. Further, the present invention requires at least 50% of the soluble fraction be composed of a monosaccharide sugar or corn syrup fraction with a dextrose equivalent exceeding 42DE. A filling with those requirements has a water activity below 0.85 and thus stability from microbiological deterioration.

The ratio of filling to biscuit can vary. As the percentage of filling increases, the palatability of the end product also increases. The economics of production however favor a higher percentage of the biscuit. In general, experiments have found that a minimum of 10% filling fraction is necessary for a significant increase in palatability while at the same time result in an improved appearance of the biscuit for the consumer. Exceeding 50% filling, the biscuit lacks enough hardness to resist breaking during commercial distribution. Between 10% and 50% filling, a biscuit design accepts filling and results in a practical end product. The preferred embodiment is approximately 25% filling to 75% biscuit.

For example, a biscuit for this invention had the following formulation:

| Ingredient | Percentage |
| --- | --- |
| Wheat flour | 47.74 |
| Wheat middlings | 20.07 |
| Meat and bone meal | 12.03 |
| Soybean meal | 5.73 |
| Ground corn | 5.73 |
| Steamed bone meal | 2.86 |
| Soybean oil | 1.72 |
| Brewer's yeast | 1.43 |
| Cheese meal | 0.86 |
| Vitamin premix | 0.86 |
| Wheat germ | 0.57 |
| Salt | 0.43 |
| Total | 100.00 |

The above formulation was blended in a dough mixer and then 24.5% water was added to the blended mixture. The dough was then run through an APV Baker die roller with a die to produce a dog biscuit similar to FIG. 6. The biscuits had the shape of a bone and a raised edge to hold a liquid filling upon the top surface of the biscuit. The biscuits were baked at 325 deg F. for 6 minutes and then were dehydrated at 230 deg F. until the moisture level dropped below 10%. The biscuits were then collated in bulk for the addition of the meaty filling.

The meaty filling for this invention was prepared by the following formulation:

| Ingredient | Percentage |
| --- | --- |
| Mechanically deboned beef | 30.55 |
| High fructose corn syrup | 30.00 |
| Sugar | 20.00 |
| Meat and bone meal | 10.00 |
| Propylene glycol | 3.50 |
| Sodium chloride | 2.50 |
| Lecithin | 1.50 |
| Agar | 1.40 |
| Antioxidant | 0.30 |
| Sodium benzoate | 0.25 |
| Total | 100.00 |

The meaty filling formulation was processed by first heating the propylene glycol and mechanically deboned beef fractions to 205 deg F. and the agar was solubilized into this slurry. The pre-warmed corn syrup fraction was then added and the temperature was maintained above 200 deg F. to distribute the agar fraction throughout the slurry. The remaining ingredients were then added and stirred into the slurry with the use of a steam jacketed kettle equipped with scraped surface agitators.

Then the slurry was deposited into the center of the top surface of each of the biscuits. First, the biscuits were aligned with the raised edge as the uppermost portion of the biscuit. Automated equipment—such as that made by Syntron, Inc.—can properly position and align the biscuits. Aligned in rows of ten abreast, the biscuits moved upon a conveyor belt and under a Hinds-Bock piston filler where approximately 4.75 g of hot filling was deposited upon the top surface of each 15 g biscuit. Upon the conveyor belt, the biscuits then crossed through a cooling section blowing air at 45 deg F. for fourteen minutes. While in the cooling section, the filling in the top of the biscuit dropped to 75 deg F. and the meaty filling set to a shelf stable gel. The biscuits then moved to a packaging station where biscuits in batches of twenty filled standup metallized film pouches. Heat sealed the biscuits within the pouches.

From these enumerated formulations, analysis revealed a biscuit with an 8.5% moisture content and a 0.52 water activity. The meaty filling turned gel had a 26.8% moisture content and a 0.81 water activity. A feeding study had ten dogs offered biscuits containing the meaty filling and control biscuits with no filling. The feeding occurred twice per day for two days. The study found that the dogs consumed 4.6 times the quantity of biscuits with meaty filling compared to the biscuits without meaty filling. Then, storage studies tested the enumerated formulations. After twelve months in storage, both the dry biscuit and the meaty filling lacked any indications of microbiological growth. The meaty filling turned gel had no indications of delaminating from the biscuit. The biscuit retained its crunch through the end of the twelve months in storage. Analysis of the storage samples revealed that the moisture in the biscuit increased to 9.5% and the water activity increased to 0.55. The moisture in the filling decreased slightly to 22.3% with a drop in water activity to 0.71. Gross weight of the samples of two phase biscuits declined slightly during the year in storage. The inventors surmise that the weight declined due to moisture migration from the filling to the outside of the sample bag. Nearly no moisture transferred from the meaty filling to the biscuit. And, following a year in storage, different moisture levels and water activity levels remained in the biscuit and meaty fillings despite the meaty filling contacting the biscuit. Further, the meaty filling showed no signs of shrinkage from the raised edge of the biscuit and no sign of sugar crystallization within the meaty filling.

While a preferred embodiment of the foodstuff containing a moist meaty filling has been described in detail, it should be apparent that modifications and variations in formulation and processing techniques thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable protein product such as fish, game, or soy may be used instead of the meaty filling described. Further, all or a major portion of the fresh meat could be replaced with water, and a dehydrated meat fraction could be substituted for the solids fraction of the disclosed fresh meat level. Alternatively, a dehydrated simple sugar fraction could be substituted for all or a portion of the high fructose corn syrup fraction, and additional fresh meat or water could be added to replace the 18% to 20% moisture in the disclosed corn syrup. A further alternative replaces all or a portion of the soluble carbohydrate fraction with hydrolyzed dehydrated meat digest fraction. This substitution allows for a higher heat level in the filling while at the same time maintaining the indicated Brix levels and water activity. Also, the biscuit may have a square, rectangular, torus or other shape instead of the dog bone described. Although a recessed cavity containing a shelf stable moist meaty filling has been described, it should be appreciated that the foodstuff containing a moist meaty filling herein described is also suitable for human candy biscuits.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A two phase foodstuff having a shelf life of at least fifteen months comprising:
   a biscuit having a top surface and a raised edge upon said top surface, said raised edge extending along the perimeter of said top surface forming a cavity within said raised edge and upon said top surface; and,
   a moist meaty filling deposited upon said top surface and within said cavity wherein said filling becomes solid at about room temperature.

2. The foodstuff of claim 1 wherein said biscuit has the shape of a dog bone.

3. The foodstuff of claim 1 further comprising:
   said biscuit having by weight percentage about 45-49% wheat flour, about 19-21% wheat middlings, about 11-13% meat and bone meal, about 4.5-6.5% soybean meal, about 4.5-6.5% ground corn, about 2.2-3.2% steamed bone meal, about 1.5-1.9% soybean oil, about 1.2-1.8% brewer's yeast, about 0.50-1.00% cheese meal, about 0.50-1.00% vitamin premix, about 0.30-0.65% wheat germ, and about 0.30-0.55% salt.

4. The foodstuff of claim 3 wherein said biscuit has by weight percentage 47% wheat flour, 20% wheat middlings, 12% meat and bone meal, 5.73% soybean meal, 5.73% ground corn, 2.86% steamed bone meal, 1.72% soybean oil, 1.43% brewer's yeast, 0.86% cheese meal, 0.86% vitamin premix, 0.57% wheat germ, and 0.43% salt.

5. The foodstuff of claim 1 wherein the ratio of said filling to said biscuit is about 21% to 50% by weight.

6. The foodstuff of claim 5 wherein the ratio of said filling to said biscuit is about 25% by weight.

7. The foodstuff of claim 1 wherein said moist meaty filling has a moisture content of about 15% to 30%, a soluble fraction of at least 65 Brix, a water activity of about 0.71 to no more than 0.85, and at least 50% of the soluble fraction composed of a monosaccharide sugar or corn syrup with a dextrose equivalent of at least 42 DE.

8. The foodstuff of claim 1 further comprising:
   said moist meaty filling having by weight percentage about 29-32% mechanically deboned beef, about 28.5-31.5% high fructose corn syrup, about 18-22% sugar, about 8-12% meat and bone meal, about 2-5% propylene glycol, about 1.5-3.5% salt, about 1.5-2.25% lecithin, about 1.5-2.1% agar, about 0.1-0.5% antioxidant, and about 0.3-0.45% sodium benzoate.

9. The foodstuff of claim 8 wherein said moist meaty filling has by weight percentage, 30.55% mechanically deboned beef, 30% high fructose corn syrup, 20% sugar, 10% meat and bone meal, 3.5% propylene glycol, 2.5% salt, 1.5% lecithin, about 1.5% agar, 0.3% antioxidant, and 0.3% sodium benzoate.

10. A method to secure a filling turned into gel upon a top surface of a biscuit with a raised perimeter edge comprising these steps:
  a) orienting said biscuit so said top surface is up; and,
  b) punching one or more holes through and perpendicular to said top surface; and,
  c) poring a liquid filling upon said top surface wherein said filling enters said holes; and,
  d) cooling said filling to solidify said filling into a gel upon said top surface and within said holes wherein said gel within said holes mechanically secures said filling to said biscuit.

\* \* \* \* \*